United States Patent
Bieringer et al.

(10) Patent No.: US 7,472,021 B2
(45) Date of Patent: Dec. 30, 2008

(54) ATMOSPHERIC FEATURE DETECTION USING LANGRANGIAN SCALAR INTEGRATION

(75) Inventors: Paul E. Bieringer, Arlington, MA (US); Sean Winkler, Maynard, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 15 days.

(21) Appl. No.: 11/472,644

(22) Filed: Jun. 22, 2006

(65) Prior Publication Data

US 2007/0118290 A1 May 24, 2007

Related U.S. Application Data

(60) Provisional application No. 60/695,589, filed on Jun. 30, 2005.

(51) Int. Cl.
*G06F 13/00* (2006.01)
(52) U.S. Cl. .................. 702/3; 702/4; 702/183; 702/190
(58) Field of Classification Search ................ 702/107, 702/123, 179, 181, 183, 189, 3, 4; 342/26; 710/5; 712/222
See application file for complete search history.

(56) References Cited

U.S. PATENT DOCUMENTS

| | | | | |
|---|---|---|---|---|
| 4,649,388 A | * | 3/1987 | Atlas | 342/26 D |
| 5,117,359 A | | 5/1992 | Eccles | |
| 5,315,297 A | * | 5/1994 | Cornman | 340/968 |
| 5,409,379 A | * | 4/1995 | Montag et al. | 434/2 |
| 5,959,567 A | * | 9/1999 | Wolfson et al. | 342/26 R |
| 6,128,578 A | * | 10/2000 | Sakaino et al. | 702/3 |
| 6,340,946 B1 | * | 1/2002 | Wolfson et al. | 342/26 R |
| 6,581,009 B1 | * | 6/2003 | Smith | 702/3 |
| 2006/0087509 A1 | * | 4/2006 | Ebert et al. | 345/473 |

OTHER PUBLICATIONS

Chang et al., A Numerical Study of the ERICA IOP 4 Marine Cyclone, Jun. 12, 1995, Naval Research Lavoratory, vol. 124, pp. 27-46.*

The Balanced Dynamical Nature of a Rapidly Intensifying Oceanic Cyclone, 2, Jul. 1995, American Meteorological Society, vol. 124, pp. 3-26.*

(Continued)

*Primary Examiner*—Eliseo Ramos-Feliciano
*Assistant Examiner*—Felix Suarez
(74) *Attorney, Agent, or Firm*—Guerin & Rodriguez, LLP; William G. Guerin (57) ABSTRACT

Described are a method and a system for detecting an atmospheric feature. A value of a meteorological scalar field at an initial time is determined for a set of tracers. Each tracer is initialized at a first tracer location. An integration time is selected according to a coherence time of a type of the feature to be detected. Alternatively, or in combination with the selected integration time, a spatial resolution of the wind field is selected according to a spatial scale of the type of feature to be detected. Each tracer is advected to a second tracer location at an earlier time according to the integration time and the wind field. A value of the meteorological scalar field at the earlier time and second tracer location is determined for each tracer and summed with the value at the first location to generate an integrated value of the meteorological scalar field.

27 Claims, 5 Drawing Sheets

OTHER PUBLICATIONS

Cohen et al., Airstream Boundaries in Numerical Weather Simulations, May 16, 1996, American Meteorological Society, vol. 125, pp. 168-183.*

12th Conference on Aviation Range and Aerospace Teteoroly, An Assessment of Automated Boundary and Front Detection to Support Convective Initiation Forecasts, Feb. 2, 2006 Abstract, pp. 1-1, retrieved from the Internet <http://ams.confex.com/ams/Annual2006/technoprogram/paper_103694.htm>, one page.*

Bieringer et al., An Assessment of Automated Boundary and Front Detection to support Convective Initiation Forecasts, Feb. 2, 2006, Federal Aviation Administration, p. 11.3, 10 pages.*

Cohen, R. et al.; "Airstream Boundaries in Numerical Weather Simulations"; American Meteorological Society; Monthly Weather Review; Jan. 1997; vol. 125; pp. 168-183.

Cohen, R. et al.; "Contraction Rate and Its Relationship to Frontogenesis, the Lyapunov Exponent, Fluid Trapping and Airstream Boundaries"; American Meteorological Society; Monthly Weather Review; May 2005; pp. 1353-1369.

Lynch, P.; "Deducing the Wind from Vorticity and Divergence"; American Meteorological Society; Monthly Weather Review, vol. 116; Jan. 1988; pp. 86-93.

Bieringer, P., et al.; "An Assessment of Automated Boundary and Front Detection to Support Convective Initiation Forecasts"; 12th Conference on Aviation Range and Aerospace Meteorology; Poster Session p. 11.3; 10 pages.

Lin, J., et al.; "A near-field tool for stimulating the upstream influence of atmospheric observations: The Stochastic Time-Inverted Lagrangian Transport (STILT) model"; Journal of Geophysical Research, vol. 108, No. D16, 4493; Aug. 2003; 18 pages.

PCT International Search Report for PCT/US2006/024425; 2 pages.

* cited by examiner

FIG. 1

← CONVERGENCE    DIVERGENCE →

FIG. 2

← CONVERGENCE    DIVERGENCE →

ATMOSPHERIC FEATURE DETECTION USING LANGRANGIAN SCALAR INTEGRATION

RELATED APPLICATION

This application claims the benefit of the earlier filing date of U.S. Provisional Patent Application Ser. No. 60/695,589, filed Jun. 30, 2005, titled "Utilization of Lagrangian Scalar Integration (LSI) for Atmospheric Feature Description," the entirety of which is incorporated herein by reference.

GOVERNMENT RIGHTS IN THE INVENTION

This invention was made with United States government support under Contract No. FA8721-05-C-0002 awarded by the Federal Aviation Administration. The government may have certain rights in the invention.

FIELD OF THE INVENTION

The invention relates generally to weather analysis and more particularly to the detection of atmospheric features using Lagrangian scalar integration.

BACKGROUND OF THE INVENTION

The ability to accurately predict the occurrence and location of various types of atmospheric phenomena has improved significantly over recent years due in part to advances in sensor technologies and remote sensing. Despite these advances, the insufficient spatial resolution of the meteorological analyses used in operational weather detection, and prediction often limit the ability to adequately resolve or identify important atmospheric features such as weather fronts, wind shifts, moisture and temperature changes, wind shear hazards and severe weather. Moreover, predictive applications such as atmospheric dispersion models are limited according to the accuracy of the meteorological analyses input data.

Many conventional atmospheric feature detection techniques are based on detecting gradients of meteorological parameters in a static, or Eulerian, analysis. These techniques have location accuracy limited by the spatial resolution of the Eulerian analysis. For example, phenomena associated with small-scale (e.g., less than 20 km) convective weather events are difficult to detect as it is not generally feasible to deploy sensors to achieve a sufficient sampling density for such phenomena. Atmospheric features extending over larger scales can also be difficult to detect due to localized features arising from geographic effects. In addition, sporadic features present in an observation can make it difficult to detect or identify features at any spatial scale.

SUMMARY OF THE INVENTION

In one aspect, the invention features a method of detecting an atmospheric feature. A value of a meteorological scalar field at an initial time is determined for a plurality of tracers each at a respective first tracer location. At least one of an integration time and a spatial resolution of a wind field are selected. The integration time is selected according to a coherence time of a type of the atmospheric feature to be detected and the spatial resolution of the wind field is selected according to a spatial scale of the type of the atmospheric feature to be detected. Each of the tracers is advected to a second tracer location at an earlier time according to the integration time and the wind field. A value of the meteorological scalar field at the earlier time and the second tracer location is determined for each tracer. The values of the meteorological scalar field at the first and second tracer locations for each tracer are summed to generate an integrated value of the meteorological scalar field.

In another aspect, the invention features a method of detecting an atmospheric feature. A value of a meteorological scalar field at an initial time is determined for a plurality of tracers each at an initial tracer location. At least one of an integration time and a spatial resolution of a wind field are selected. The integration time is selected according to a coherence time of a type of the atmospheric feature to be detected and the spatial resolution of the wind field is selected according to a spatial scale of the type of the atmospheric feature to be detected. Each of the tracers is advected to a prior tracer location at an earlier time according to the time interval and the wind field. A value of the meteorological scalar field at the earlier time and the prior tracer location is determined for each tracer. The steps of advecting and determining a value of the meteorological scalar field are repeated a predetermined number of times during the integration time. For each tracer, the values of the meteorological scalar field at the initial tracer location and the prior tracer locations are summed to generate an integrated value of the meteorological scalar field.

In yet another aspect, the invention features a system for detecting an atmospheric feature. The system includes means for determining a value of a meteorological scalar field at a first time for a plurality of tracers each at a first tracer location. The system also includes means for advecting each of the tracers to a second tracer location at an earlier time according to the integration time and the wind field, means for determining for each tracer a value of the meteorological scalar field at the earlier time and the second tracer location, and means for summing the values of the meteorological scalar field at the first and second tracer locations for each tracer to generate an integrated value of the meteorological scalar field.

In still another aspect the invention features a system for detecting an atmospheric feature. The system includes an advection module, a scalar processor in communication with the advection module and an accumulator module in communication with the scalar processor. The advection module is adapted to receive a wind field for a plurality of times. The advection module advects a plurality of tracers according to the wind field to determine prior locations of each tracer. The time is predetermined according to a coherence time of a type of the atmospheric feature to be detected. The scalar processor is adapted to receive a meteorological scalar field for a plurality of times and to determine for each tracer a value of the meteorological scalar field at the prior locations of the tracer. The accumulator module sums the values of the meteorological scalar field at the prior locations for each of the tracers to generate an integrated value of the meteorological scalar field.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In brief overview, the invention relates to a method and a system for detecting an atmospheric feature. The method utilizes a Lagrangian scalar integration (LSI) technique as a temporal filter that sums meteorological information acquired for multiple times. Features that are coherent in time are amplified while features that are not coherent (i.e., temporally sporadic) over the integration time are de-emphasized. The inclusion of temporal information allows for an effectively denser spatial sampling of the original coarse resolution analysis. In essence, the method compensates for low spatial resolution by including dynamically consistent information from multiple temporal samples.

The method of the invention can be applied to fields present in a two-dimensional or three-dimensional fluid flow where a conserved scalar is transported by the fluid flow. Although described below primarily with respect to atmospheric phenomena, the invention also contemplates utilization of the method in other applications such as oceanographic applications. Atmospheric applications include atmospheric feature detection and specification of initial conditions for weather prediction models. The vertical dimension of the atmosphere can often be ignored, depending on the type of atmospheric feature to be detected and the selected integration time. The method can be used to improve the signal to noise ratio of the data used by feature detection algorithms. Such algorithms are used by commercial, university and government groups to detect weather fronts, moisture or temperature changes, wind shifts, precipitation, aviation wind shear hazards and severe weather. Data used to initialize regional scale numerical weather prediction models are more accurately specified, leading to more accurate weather forecasts. Similarly, chemical and biological hazard assessment tools, such as dispersion models, can provide more accurate results using higher accuracy input data. For example, users who can benefit from the method include fire fighting personnel and the agricultural, forestry and aviation industries.

Figure 1:
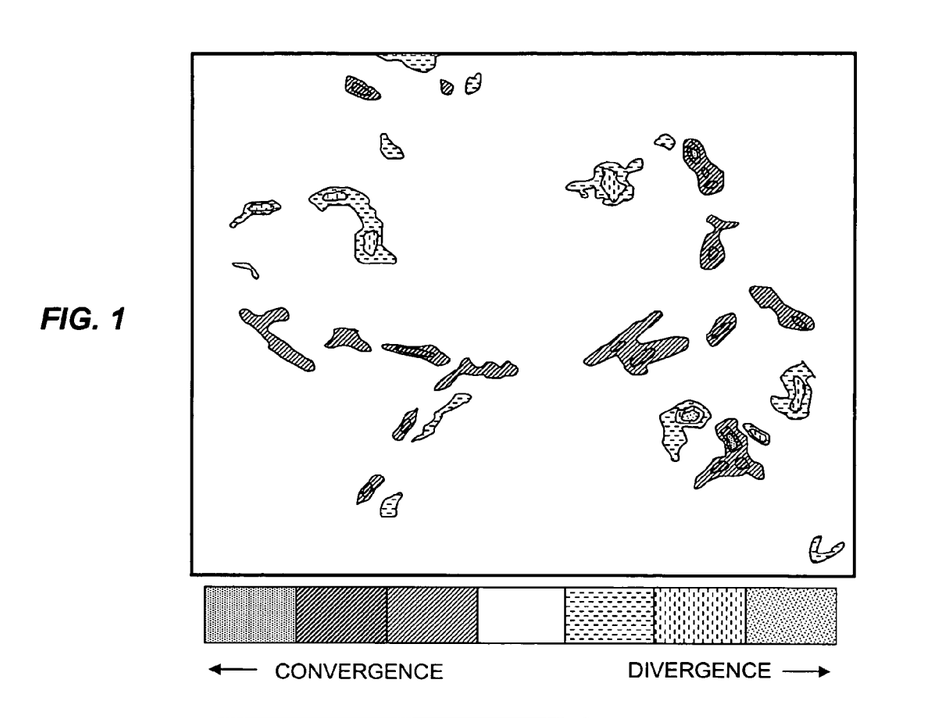
FIG. 1 depicts an image of a divergence field for a geographical area based on a Eulerian analysis.

FIG. 1 illustrates an image of a divergence field for a geographical area at one time. By way of example, divergence features can be associated with downdrafts from thunderstorms and convergence features can be associated with outflow boundaries propagating away from convective weather. Due to the sporadic nature of some of the features, it is generally difficult to determine features that have existed or will exist for a significant time (e.g., 30 minutes to several hours or more).

Figure 2:
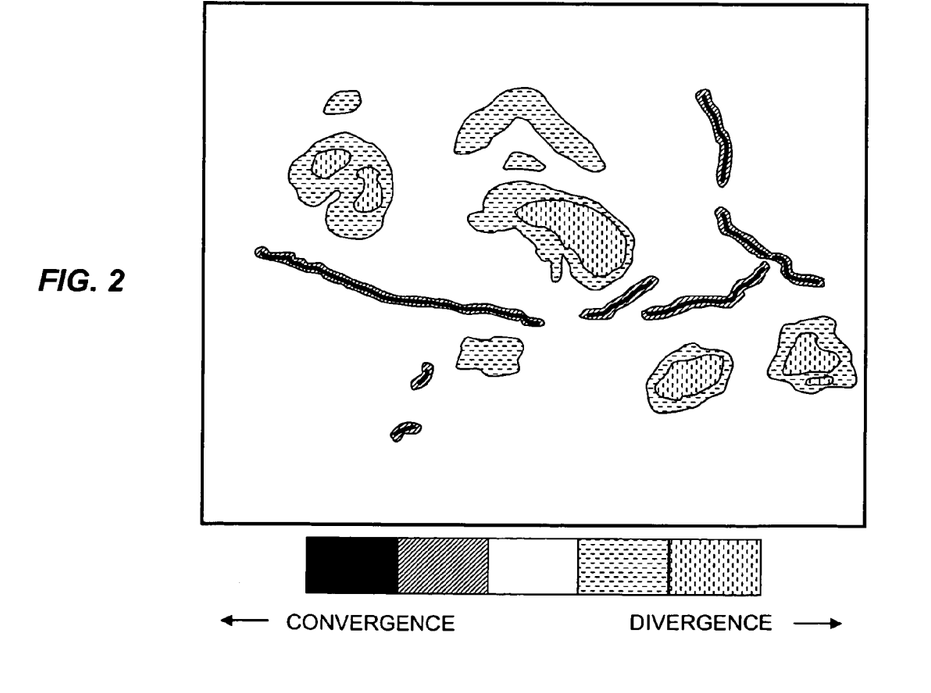
FIG. 2 depicts an image of a divergence field for a geographical area generated according to an embodiment of the method of the invention.

FIG. 2 illustrates an image of a divergence field for the same geographical area and time as the image of FIG. 1. The divergence image is generated according to an embodiment of the method of the invention in which consecutive temporal samples similar in format to the single temporal sample used to generate the image of FIG. 1 are utilized. Features having long-lasting divergence or convergence are evident in the image while sporadic features present in only a few or less of the temporal samples are absent from the image. Fine lines of convergence and broad areas of divergence are easily discernible.

The method of the invention utilizes wind field data from which reverse trajectories are determined for phenomena that follow the wind flow. Meteorological scalar fields that follow the wind flow include by way of example wind shifts, wind divergence, vorticity and wind deformation. Temperature and moisture can also follow the wind flow although generally to a lesser degree. Scalar values along the trajectories are integrated in reverse time. The signal to noise ratios of features that are coherent over the integration time and follow the wind flow are improved in comparison to the signal to noise ratios for features detected in a static or Eulerian analysis. The method of the invention can include a selection of a spatial resolution of the wind field. Use of a coarse resolution wind field enables small scale weather features such as those due to wind variations or turbulence induced by local geographic features to be reduced or eliminated from the enhanced image of atmospheric features provided by the method.

Figure 3:
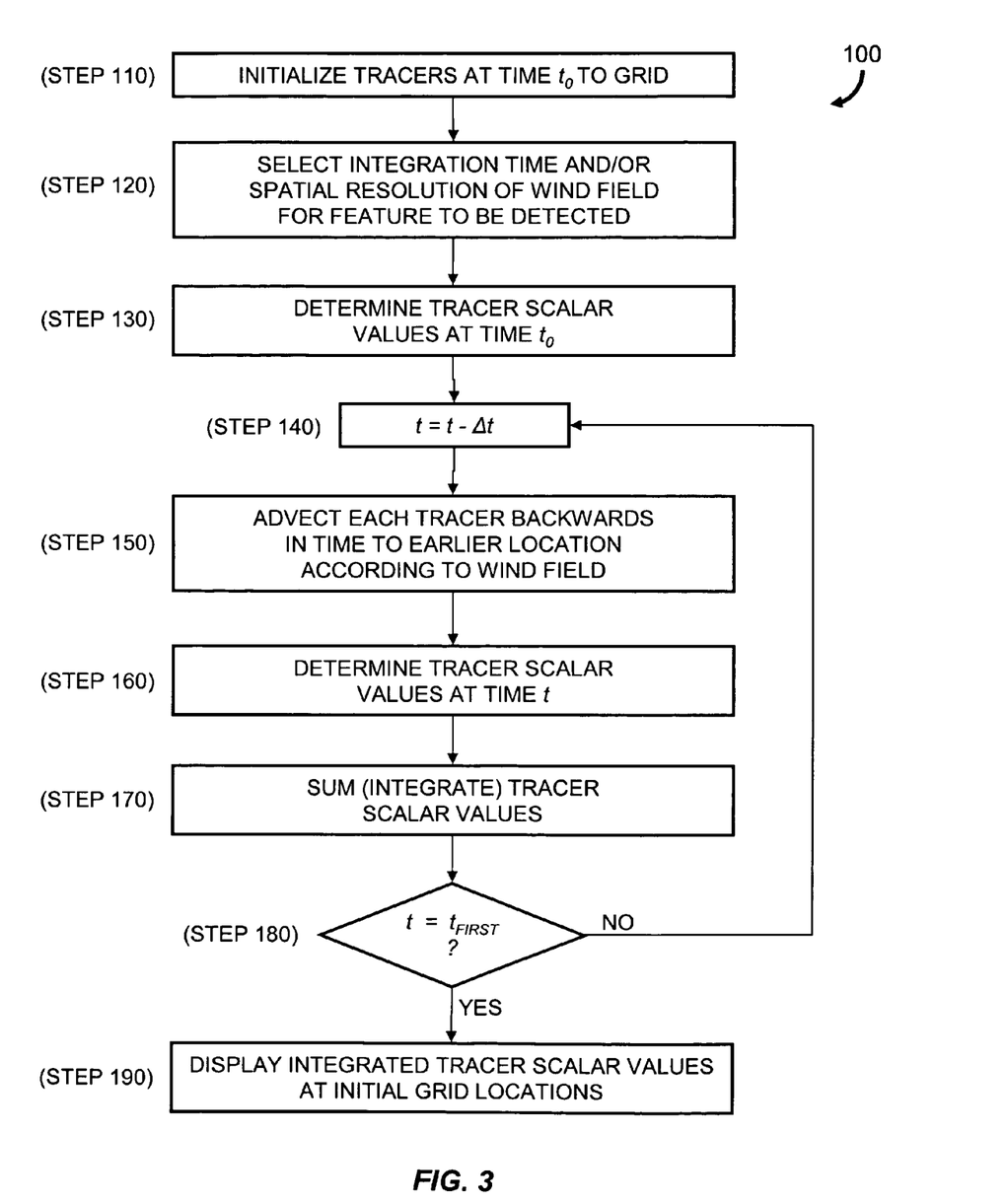
FIG. 3 is a flowchart representation of an embodiment of a method of detecting an atmospheric feature according to the invention.
Figure 4:
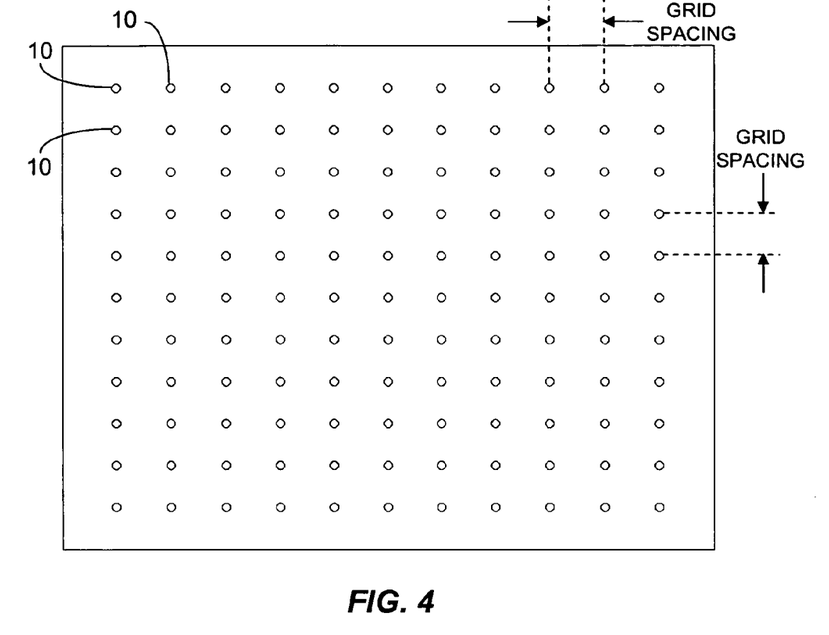
FIG. 4 depicts a two-dimensional grid of tracers at an initial time according to an embodiment of the method of the invention.

FIG. 3 is a flowchart representation of an embodiment of a method 100 of detecting an atmospheric feature according to the invention. A two-dimensional grid of tracers points (hereafter "tracers") is defined (step 110) for an initial time $t_0$ as shown in FIG. 4. The initial time $t_0$ represents the current time or the latest observation time. The difference between the initial time $t_0$ and the earliest acquisition time $t_{FIRST}$ of scalar observation data is the integration time of the method 100. Each tracer notionally acts as a numerical weather balloon that gathers data on the available atmospheric variables over the integration time.

Figure 5:
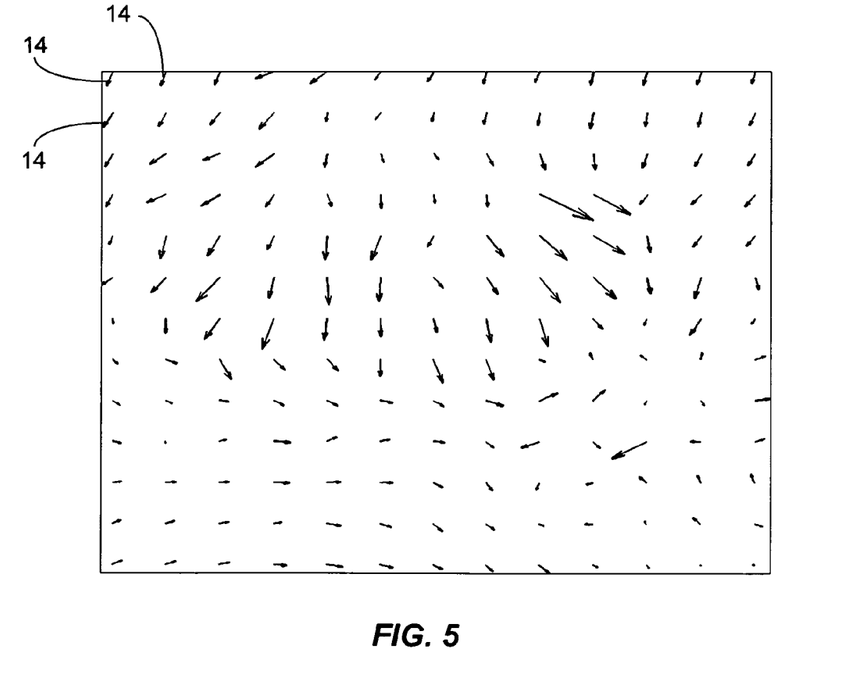
FIG. 5 graphically depicts a wind field at an initial time where each vector represents a direction and velocity of the wind for a geographical area centered on the vector location.

FIG. 5 illustrates a wind field at the time $t_0$. Each vector 14 represents a direction of the wind associated with a geographical area centered on the vector location. The length of each vector 14 indicates the wind velocity for the corresponding geographical area. If the received wind field has a higher spatial resolution than desired, the directional values and velocity values associated with groups of neighboring vectors can be averaged to obtain single vectors for larger geographical areas. Alternatively, some of the vectors 14 can be discarded to create a coarser wind field. For example, every other vector 14 in each row and in each column can be discarded to decrease the spatial resolution of the wind field by a factor of 2.

Referring again to FIG. 3, the integration time is selected (step 120) according to the type of atmospheric feature to be detected. For example, outflow boundaries from convective complexes can persist for several hours while large scale weather fronts can exist for days. By way of example, the integration time for detecting outflow boundaries can be selected as two hours whereas the integration time for detection of weather fronts can be chosen to be 12 hours or more. To optimize atmospheric feature detection, the integration time should be approximately the same as the duration of the feature to be detected although significant improvement in feature detection can still be realized with shorter integration times.

The integration time should also be selected to ensure an adequate number of temporal samples are included. If a temporal sample is acquired once every 15 minutes then preferably the integration time for detecting outflow boundaries is longer than the integration time used if the observational sample is acquired once every 5 minutes. For example, a two hour integration time for 15 minutes samples includes nine samples while a one hour integration time for 5 minute samples includes 13 samples. The increased number of temporal samples can in some applications at least partially compensate for the shorter integration time.

The spatial resolution of the wind field can be selected (step 120) in addition to or instead of the selection of the integration time. If the atmospheric feature to be detected is of greater spatial extent, wind field data at a lower spatial resolution are preferred. Thus localized features unrelated to the large-scale feature to be detected are spatially filtered from the data according to the method 100.

Values of the meteorological scalar field at the initial time to and initial tracer locations (see FIG. 4) are determined (step 130). Although the tracer locations in some embodiments of the method 100 can be initialized at data point locations of the scalar field, generally tracer locations at subsequent steps in the method 100 are not collocated with scalar field data points. Consequently, the scalar field value for a tracer 10 is determined by interpolation using scalar values of neighboring data points in the meteorological scalar field.

The method 100 continues by decrementing (step 140) the time t by an interval Δt. Preferably, wind field data are generated by interpolation for one or more times between received temporal samples of wind field data as the desired temporal resolution Δt is generally smaller (i.e., "finer") than the temporal resolution of the available wind field data. In another embodiment, scalar field data are generated for one or more times between the temporal samples of the scalar field data. Thus the method 100 can operate on interpolated data generated for times between data acquisition times.

Figure 6:
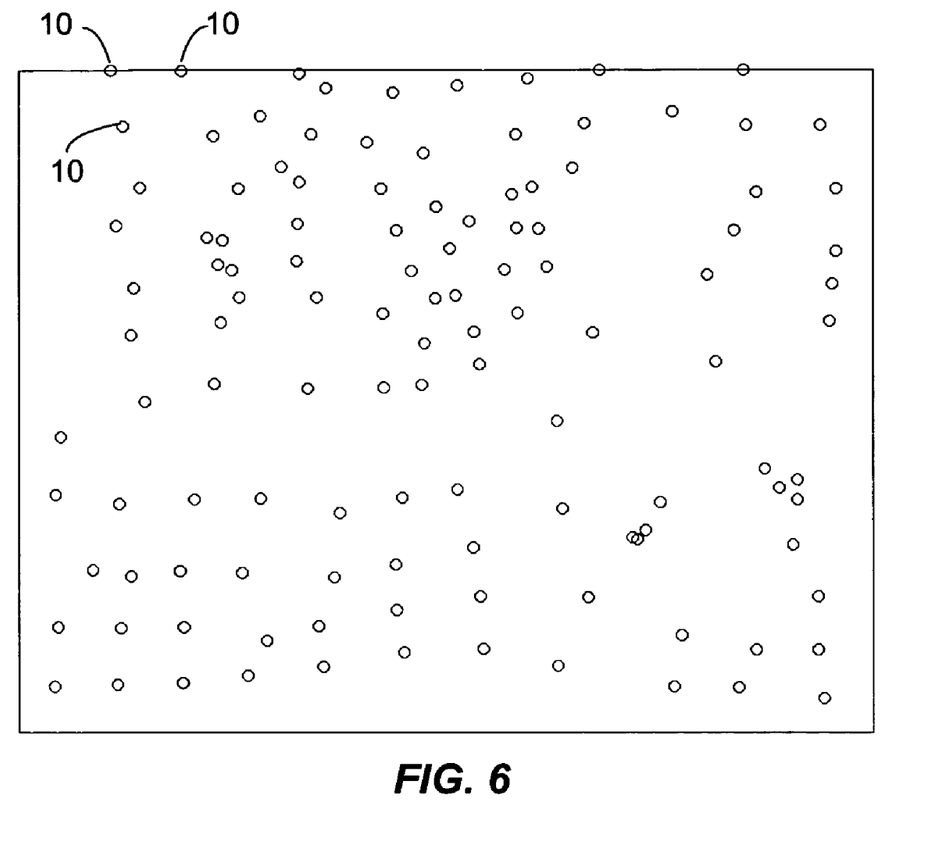
FIG. 6 depicts the locations of the tracers of FIG. 4 after backwards advection based on the wind field of FIG. 5 according to an embodiment of the method of the invention.

The tracers 10 are advected (step 150) backwards in time to according to the wind field at the time t to determine prior tracer locations at the earlier time. FIG. 6 illustrates the tracers 10 at the prior tracer locations after backwards advection according to the wind field of FIG. 5. The directions of advection are opposite to the directions of the wind field at the tracer locations.

The scalar value of each tracer 10 is determined (step 160) at its prior tracer location and added (step 170) to the scalar value of the tracer 10 at its location before the backwards advection was implemented. The method 100 generally returns to step 140 so that the tracers 10 are again advected backwards in time to prior tracer locations at earlier times according to earlier wind field data, scalar values are determined at the prior locations and the scalar values are added with previously determined scalar values to achieve a Lagrangian scalar integration. However, when it is determined (step 180) that the time has decremented to the earliest acquisition time $t_{FIRST}$ as defined by the selected integration time, an enhanced image of the atmospheric features is presented (step 190) to the user as a graphical display of the summed (i.e., integrated) tracer scalar value for each tracer at the initial (grid) location of the tracer. The enhanced feature image exhibits an improved signal to noise ratio for atmospheric features having durations comparable to or exceeding the integration time and for atmospheric features having a spatial extent comparable to or exceeding the resolution of the wind field. Consequently, the location of atmospheric features can more easily be determined.

Orthogonal wind components can be determined using vorticity data, divergence data and some knowledge of the wind at the boundary of the wind field as is known in the art. Several computational techniques are described in Lynch, Peter (1988) Deducing the Wind from Vorticity and Divergence, *Monthly Weather Review,* 116, 86-93, which is incorporated herein by reference. In one embodiment of the method of the invention, a filtered wind field is determined from the integrated tracer scalar values for a vorticity field and the integrated tracer scalar values for a divergence field. In this embodiment the LSI filtered vorticity and divergence fields include features of interest according to the selected integration time, number of samples and spatial resolutions. The two filtered scalar fields are used to generate orthogonal wind field components that benefit from the LSI filtering of the original wind field. Thus the filtered wind field does not include unwanted "noise" in the original wind field but does preserve the types of atmospheric features desired to be detected. This embodiment is particularly useful for applications that are sensitive to noise in the wind field, such as the initialization of numerical weather prediction models, transport models and dispersion models.

Figure 7:
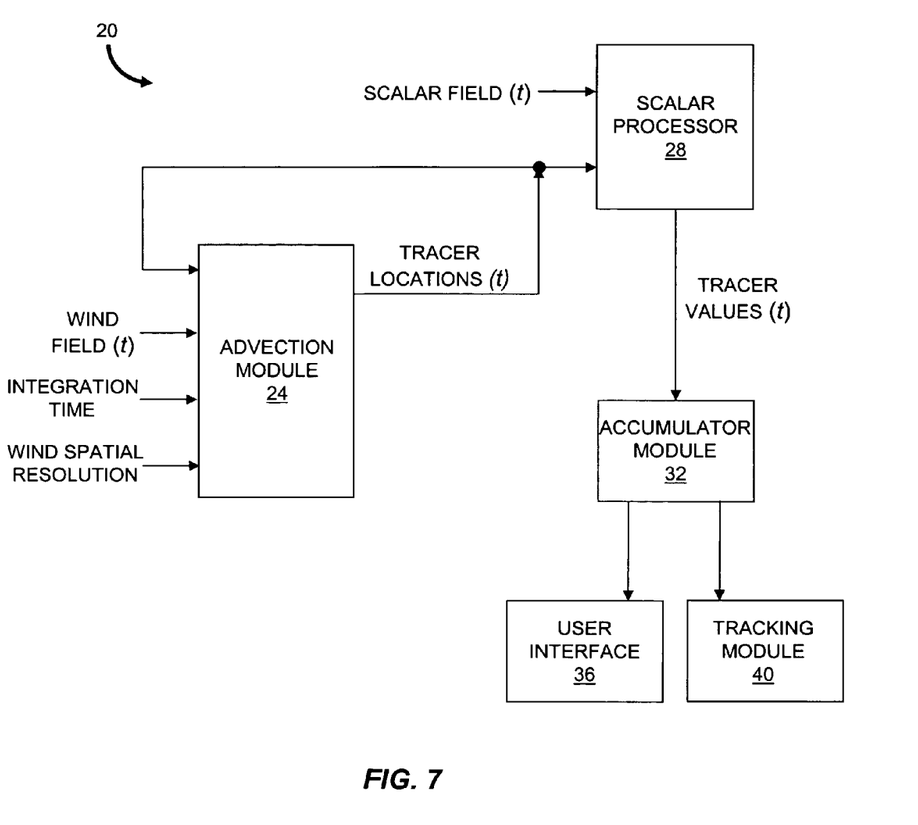
FIG. 7 is a functional block diagram of an embodiment of a system for detecting an atmospheric feature according to the invention.

FIG. 7 is a functional block diagram of a system 20 for detecting an atmospheric feature suitable for one embodiment of the invention. The system 20 includes an advection module 24 in communication with a scalar processor 28 and an accumulator module 32. The scalar processor 28 also communicates with the accumulator module 32. The accumulator module 32 also communicates with a display 36 and a tracking module 40. The modules and processor can be realized as distinct modules communicating with each other through any of a variety of communication channels. Alternatively, two or more of the modules and processor can be implemented as functionally distinct modules in a common module.

The advection module 24 is configured to receive or is preset to utilize a selected integration time according to the coherence time of the type of atmospheric features to be detected. Similarly, the advection module 24 is configured to receive or is preset to utilize a selected value for the resolution based on the spatial dimension of the type of atmospheric features to be detected. Wind field data sets, each representing the direction and speed of the wind at one time as a function of location, are received. Each data set is separated in time from temporally adjacent wind field data sets by a time Δt. In some embodiments, wind field data are provided periodically as the data are generated (i.e., once per time period Δt). In other embodiments, such as during an application of the method of the invention to historical data, wind field data sets for the multiple times can be provided asynchronously or as a single larger data group. In still other embodiments, wind field data for one or more of the times are interpolated from consecutive observational data acquired at multiples of the data separation time Δt.

The advection module 24 generates data indicating the locations of the tracers after backwards advection to a time t−Δt. These prior tracer locations are provided to the scalar processor 28 and are also "returned" to the advection module 24 for further backwards advection using a set of wind field data for an earlier time. In addition to the tracer location data, the scalar processor 28 receives multiple scalar data sets each indicating values of a meteorological scalar field as a function of location at one time. Scalar field data can be received at the same rate as wind field data. In some embodiments, scalar field data sets are provided periodically as they are generated.

In other embodiments, the scalar field data for one or more of the times are interpolated from consecutive observational scalar field data acquired at multiples of the data separation time Δt. The scalar processor 28 determines the values of the scalar field corresponding to the tracer locations received from the advection module 24. These scalar values are provided to the accumulator module 32.

The accumulator module 32 receives the scalar values from the scalar processor 28. For each tracer, the associated scalar value in a data set provided by the scalar processor is added to the sum of the previous scalar values stored in the accumulator module for the prior tracer locations of the tracer. In this manner, the accumulator 32 sums (i.e., accumulates or integrates) scalar values as the tracer is advected backwards in time. Once wind field data and scalar field data are processed for the entire integration time, an enhanced image of the atmospheric feature is generated and presented to a user through a user interface 36. The enhanced image includes the integrated scalar value for each tracer assigned to the initial tracer location (i.e., grid location at the initial time $t_0$). In the illustrated embodiment, the integrated scalar values are also provided to the tracking module 40 which generates tracking vectors for features common to multiple enhanced images. Tracking vector data in turn can be provided to other modules to perform various predictive applications and analyses.

While the invention has been shown and described with reference to specific embodiments, it should be understood by those skilled in the art that various changes in form and detail may be made therein without departing from the spirit and scope of the invention.

What is claimed is:

1. A method of detecting an atmospheric feature, the method comprising:
    determining a value of a meteorological scalar field at an initial time for a plurality of tracers each at a first tracer location;
    selecting at least one of an integration time and a spatial resolution of a wind field, the integration time being selected according to a coherence time of a type of the atmospheric feature to be detected, the spatial resolution of the wind field being selected according to a spatial scale of the type of the atmospheric feature to be detected;
    advecting each of the tracers to a second tracer location at a specified time according to the integration time and the wind field;
    determining for each tracer a value of the meteorological scalar field at the specified time and the second tracer location; and
    summing the values of the meteorological scalar field at the first and second tracer locations for each tracer to generate an integrated value of the meteorological scalar field.

2. The method of claim 1 further comprising generating an enhanced image of the atmospheric feature at the initial time by displaying the integrated values of the meteorological scalar field at the first tracer locations.

3. The method of claim 1 wherein the meteorological scalar field is one of a divergence field, vorticity field, wind deformation and wind direction change field.

4. The method of claim 1 wherein the meteorological scalar field comprises a vorticity field and a divergence field, and further comprising generating a filtered wind field from the integrated values of the vorticity field and the integrated values of the divergence field.

5. The method of claim 1 further comprising determining a location of the atmospheric feature in response to the integrated values of the meteorological scalar field at the first tracer locations.

6. The method of claim 1 wherein the first tracer locations are defined by a set of grid points.

7. The method of claim 6 wherein the second tracer locations comprise locations between the grid points.

8. The method of claim 7 wherein the determination of the values of the meteorological scalar field at the second tracer locations comprises interpolating values of the meteorological scalar field at the locations between the grid points.

9. The method of claim 1 further comprising repeating the steps of advecting and determining the values of the meteorological scalar field at the second tracer locations.

10. The method of claim 9 wherein the step of summing comprises summing, for each tracer, the values of the meteorological scalar field at all of the tracer locations.

11. A method of detecting an atmospheric feature, the method comprising:
    (a) determining a value of a meteorological scalar field at an initial time for a plurality of tracers each at an initial tracer location;
    (b) selecting at least one of an integration time and a spatial resolution of a wind field, the integration time being selected according to a coherence time of a type of the atmospheric feature to be detected, the spatial resolution of the wind field being selected according to a spatial scale of the type of the atmospheric feature to be detected;
    (c) advecting each of the tracers to a prior tracer location at a specified time according to the time interval and the wind field;
    (d) determining for each tracer a value of the meteorological scalar field at the specified time and the prior tracer location;
    (e) repeating steps (c) and (d) a predetermined number of times during the integration time; and
    (f) for each tracer, summing the values of the meteorological scalar field at the initial tracer location and the prior tracer locations to generate an integrated value of the meteorological scalar field.

12. The method of claim 11 further comprising generating an enhanced image of the atmospheric feature at the initial time by displaying the integrated values of the tracers at the initial tracer locations.

13. The method of claim 12 further comprising:
    generating at least one additional enhanced image of the atmospheric feature at a later time; and
    generating a plurality of tracking vectors in response to common features included in the enhanced image and the at least one additional enhanced image.

14. The method of claim 11 wherein the meteorological scalar field is one of a divergence field, vorticity field, wind deformation and wind direction change field.

15. The method of claim 11 wherein the meteorological scalar field comprises a vorticity field and a divergence field, and further comprising generating a filtered wind field from the integrated values of the vorticity field and the integrated values of the divergence field.

16. The method of claim 11 further comprising determining a location of the atmospheric feature in response to the integrated values of the meteorological scalar field at the initial tracer locations.

17. The method of claim 11 wherein the initial tracer locations are defined by a set of grid points.

18. The method of claim 17 wherein the subsequent tracer locations comprise locations between the grid points.

19. The method of claim 18 wherein the determination of the values of the meteorological scalar field at the prior tracer locations comprises interpolating values of the meteorological scalar field at the locations between the grid points.

20. A system for detecting an atmospheric feature comprising:
   means for determining a value of a meteorological scalar field at a first time for a plurality of tracers each at a first tracer location;
   means for selecting at least one of an integration time and a spatial resolution of a wind field, the integration time being selected according to a coherence time of a type of the atmospheric feature to be detected, the spatial resolution of the wind field being selected according to a spatial scale of the type of the atmospheric feature to be detected;
   means for advecting each of the tracers to a second tracer location at a specified time according to the integration time and the wind field;
   means for determining for each tracer a value of the meteorological scalar field at the specified time and the second tracer location; and
   means for summing the values of the meteorological scalar field at the first and second tracer locations for each tracer to generate an integrated value of the meteorological scalar field.

21. The system of claim 20 further comprising means for generating an enhanced image of the atmospheric feature at the first time by displaying the integrated values of the meteorological scalar field at the first tracer locations.

22. The system of claim 20 wherein the meteorological scalar field comprises a vorticity field and a divergence field and further comprising means for generating a filtered wind field from the integrated values of the vorticity field and the integrated values of the divergence field.

23. A system for detecting an atmospheric feature comprising:
   an advection module adapted to receive a wind field for a plurality of times, the advection module advecting a plurality of tracers according to the wind field to determine prior locations of each tracer, the times being predetermined according to a coherence time of a type of the atmospheric feature to be detected;
   a scalar processor in communication with the advection module, the scalar processor adapted to receive a meteorological scalar field for a plurality of times and to determine for each tracer a value of the meteorological scalar field at the prior locations of the tracer; and
   an accumulator module in communication with the scalar processor, the accumulator module summing the values of the meteorological scalar field at the prior locations for each of the tracers to generate an integrated value of the meteorological scalar field.

24. The system of claim 23 wherein a spatial resolution of the wind field is predetermined according to a spatial scale of the type of the atmospheric feature to be detected.

25. The system of claim 23 further comprising a user interface in communication with the accumulator module to graphically display the integrated values of the meteorological scalar field for each of the tracers at the initial time.

26. The system of claim 23 wherein the integrated values of the meteorological scalar field generated by the accumulator module comprises an enhanced image of the atmospheric feature.

27. The system of claim 26 further comprising a tracking module in communication with the accumulator module, the tracking module generating a plurality of tracking vectors for common features included in a plurality of enhanced images of the atmospheric feature received from the accumulator module.

* * * * *

UNITED STATES PATENT AND TRADEMARK OFFICE
CERTIFICATE OF CORRECTION

PATENT NO.        : 7,472,021 B2                               Page 1 of 1
APPLICATION NO.   : 11/472644
DATED             : December 30, 2008
INVENTOR(S)       : Bieringer et al.

It is certified that error appears in the above-identified patent and that said Letters Patent is hereby corrected as shown below:

In column 1, delete the entire paragraph that starts at line 15 and ends at line 18.

In column 1, insert the following paragraph at line 15:

--This invention was made with government support under grant number F19628-00-C-0002 awarded by the Air Force. The government has certain rights in this invention.--.

Signed and Sealed this
Fifth Day of April, 2011

David J. Kappos
*Director of the United States Patent and Trademark Office*